United States Patent
McCormick et al.

(10) Patent No.: US 7,184,120 B2
(45) Date of Patent: Feb. 27, 2007

(54) FILM SOUNDTRACK REVIEWING SYSTEM

(75) Inventors: Tom McCormick, Malibu, CA (US); Leo O'Donnell, Pacific Palisades, CA (US); Shawn Jones, Los Angeles, CA (US)

(73) Assignee: NT Audio Visual Supply, Inc., Santa Monica, CA (US)

( * ) Notice: Subject to any disclaimer, the term of this patent is extended or adjusted under 35 U.S.C. 154(b) by 0 days.

(21) Appl. No.: 11/284,654

(22) Filed: Nov. 21, 2005

(65) Prior Publication Data

US 2006/0072071 A1 Apr. 6, 2006

(51) Int. Cl.
*G03B 21/32* (2006.01)
*G03B 31/00* (2006.01)

(52) U.S. Cl. .......................... 352/40; 352/11
(58) Field of Classification Search ............... 352/11, 352/34, 35, 40; 52/6, 8; 348/745
See application file for complete search history.

(56) References Cited

U.S. PATENT DOCUMENTS

| | | | |
|---|---|---|---|
| 2,826,112 A | 3/1958 | Mueller | 352/37 |
| 3,545,143 A * | 12/1970 | Bankston | 52/6 |
| 3,668,810 A * | 6/1972 | Bankston | 52/6 |
| 4,385,814 A | 5/1983 | Elliott | 352/92 |
| 5,327,182 A | 7/1994 | Kohut et al. | 352/37 |
| 5,611,174 A * | 3/1997 | Hayashi | 52/8 |
| 5,751,398 A | 5/1998 | Beard | 352/92 |
| 5,841,513 A | 11/1998 | Yoshimura et al. | 352/27 |
| 6,157,434 A | 12/2000 | Ueno et al. | 352/27 |
| 6,211,940 B1 | 4/2001 | Seagrave et al. | 352/27 |
| 2004/0027496 A1* | 2/2004 | Morales | 348/745 |

FOREIGN PATENT DOCUMENTS

EP 0 076 237 4/1983

* cited by examiner

*Primary Examiner*—Rodney Fuller
(74) *Attorney, Agent, or Firm*—Jeffer Mangels Butler Marmaro (57) ABSTRACT

A system and method of screening films. The method includes the first step of displaying a movie print with multiple soundtracks on a display screen. A plurality of screening rooms, each with a view of the display screen, is provided. Separate audio signals from each soundtrack is generated and one or more of the audio signals is transmitted to one or more of the screening rooms. A system for screening films includes a display; a plurality of screening rooms, wherein each screening room includes a view of the display; a movie playback system; and, a sound distribution system coupled to receive audio signals from the movie playback system and to distribute the audio signals to the plurality of screening rooms.

30 Claims, 6 Drawing Sheets

FILM SOUNDTRACK REVIEWING SYSTEM

FIELD OF THE INVENTION

The present invention relates generally to audio soundtrack playback and review, and more particularly, to a system and method for reviewing soundtracks on 35 mm motion picture film.

BACKGROUND OF THE INVENTION

Current 35 mm motion picture film prints employ both analog and digital sound recording formats to produce sound for playback with the display of the picture. Soundtrack information is stored on the film print using multiple methods. The first technique places the soundtrack information onto the film along with the picture. The film is then optically scanned with the appropriate pickup device to reproduce the audio soundtrack. This technique is used for both analog and digital soundtracks. In another technique, a digital time code track is printed onto the film to associate the display of the picture with playback of digital audio data stored on a large capacity storage device, such as a compact disc.

The process of creating film release prints for distribution to theaters begins with the creation of the master picture and soundtrack negatives. One picture negative and sound negative set can be used to make several thousand release prints.

Before release prints are made a single "answer" print or "check" print is created to review picture and sound quality. If the quality of the check print is determined to be acceptable, then multiple prints are made for distribution. Otherwise, any problems identified in the check print or master negatives will be addressed and another check print will be created, until all problems are corrected. It is extremely important that any quality issues be determined and resolved with the check print before distribution prints are made. Significant cost savings are achieved by eliminating defective distribution prints.

One important aspect of the quality check is the synchronization of the soundtrack and the picture. Specifically, the soundtrack must be synchronized to the visual images in the motion picture. Other aspects of the sound quality review include the detection of sudden decreases in sound volume ("drop outs"), hisses, scratches, or other unwanted artifacts. These defects, if not corrected, will be duplicated in the distribution prints sent to theaters.

Currently, the inspection of each check print requires a reviewer to view the motion picture from beginning to end in order to detect quality issues during playback. However, as the reviewer can only listen to one complete soundtrack during each playback, the reviewer must watch and listen to the check print as many times as there are audio soundtracks on the film. Thus, a two-hour film with four soundtracks takes at least eight hours to review. In addition, the playback must be done in front of a screen that provides the reviewer a large enough display of the motion picture to see and hear details such as lip movement and other actions, e.g., explosions, that require synchronization with the soundtrack. Thus, rooms as large as typical movie theaters are commonly used.

Accordingly, there is a need to overcome the issues noted above.

SUMMARY OF THE PREFERRED EMBODIMENTS

The present invention provides a film soundtrack screening system for films with multiple soundtracks that permits simultaneous review of multiple soundtracks during one playback. In general, the screening system provides a separate screening room for each soundtrack to be simultaneously screened or reviewed and an audio system, which feeds each soundtrack to each separate room. The system enables the review of the quality of multiple soundtracks by allowing all reviewers, located in their respective screening rooms, to simultaneously view the same print or image while checking their respective soundtracks.

In one preferred embodiment of the present invention, the system includes a display for viewing the movie print, with the image having a plurality of soundtracks. The system further includes a plurality of screening rooms, each screening room with a separate display; and, an audio playback system that delivers a soundtrack from the plurality of soundtracks to each screening room. During playback of the print, the different soundtracks are played simultaneously.

In another embodiment, a method performed in accordance with the present invention include the provision of a single display screen to view the movie print and a plurality of screening rooms, each with a view of the display screen. The print includes a plurality of soundtracks, and each screening room receives one of the soundtracks to allow a simultaneous review of at least two of the plurality of soundtracks along with a playback of the image.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE INVENTION

Figure 1:
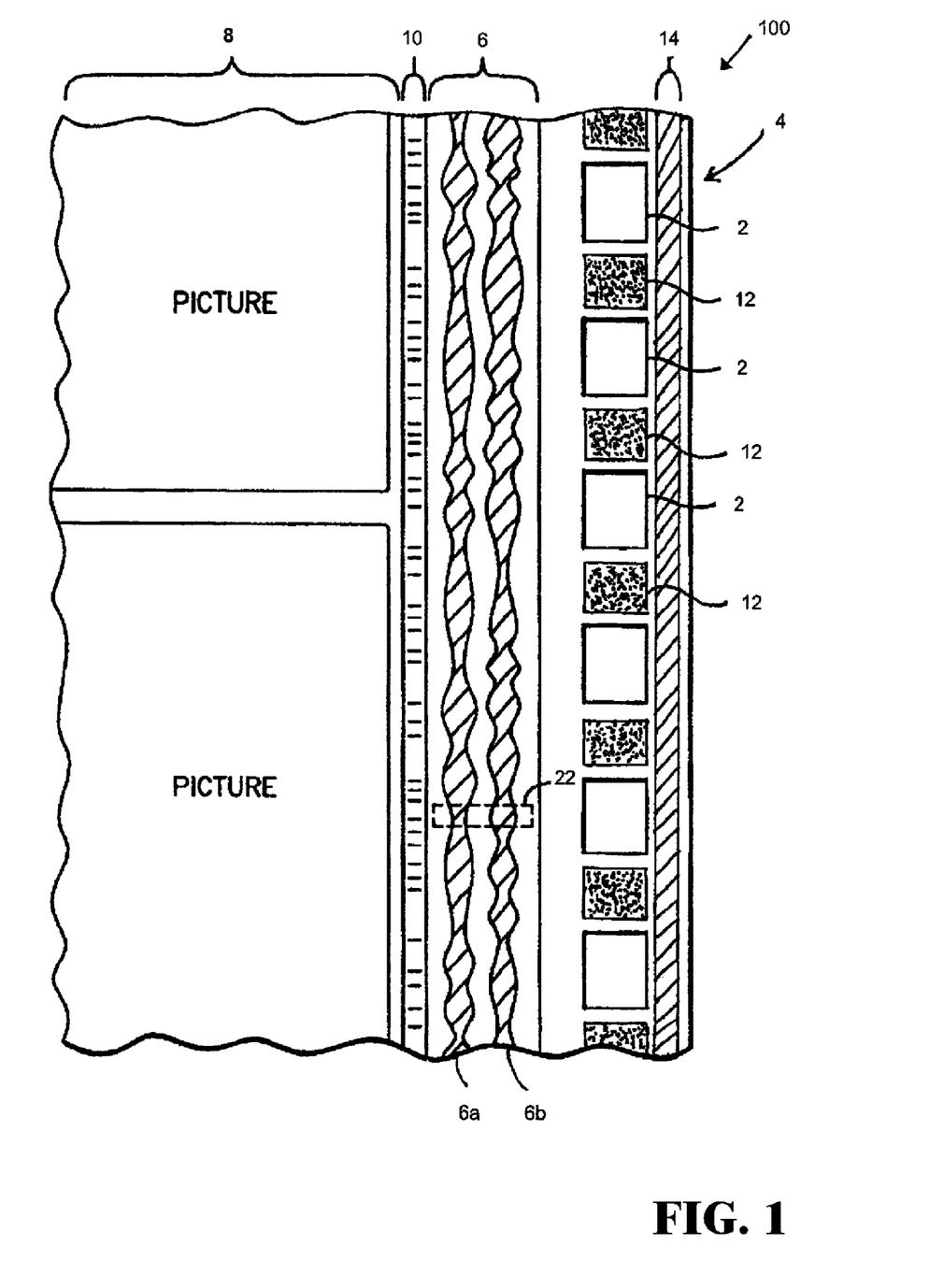
FIG. 1 is an illustration of a portion of a 35 mm film print with multiple soundtracks, including analog and digital soundtracks and digital time codes.

FIG. 1 illustrates a portion of a motion picture film print 100 that includes multiple soundtracks, including analog and digital soundtracks and digital time codes. A series of sprocket holes 2 lays between an edge 4 of film print 100 and an analog soundtrack area 6. Film print 100 also includes a picture area 8, a digital time code (DTS, a trademark of Digital Theater Systems Corporation) area 10, a series of DOLBY DIGITAL, a trademark of Dolby Laboratories Licensing Corporation, data blocks 12, and a SONY DYNAMIC DIGITAL SOUND (SDDS), a trademark of Sony Corporation, soundtrack area 14. It should be noted that in the description contained herein, references to the term "soundtrack" generally encompass information on film print 100 that is related to the reproduction of sound, whether the sound information is in analog or digital format, or related to sound information retrieved from other sources based on information in the soundtrack.

Analog soundtrack area 6 contains a pair of stereo analog soundtracks 6a and 6b, which are included in all 35 mm motion picture release prints as analog sound playback systems are ubiquitous in all motion picture projection systems. Further, the analog sound format is used as a back-up system in case any of the digital sound systems are inoperative or not installed. Picture area 8, which is spaced inward from analog soundtrack area 6, contains the respective picture frames.

A reader (not shown in FIG. 1) is placed over a section 22 above film print 100 to optically read the information in analog soundtrack area 6, which is then sent to a decoder (not shown in FIG. 1) that then converts the optically read analog tracks into an audio signal. Similarly, information from DTS area 10, DOLBY DIGITAL data blocks 12 and SDDS soundtrack area 14 are each read by a separate reader (not shown in FIG. 1) and sent to a decoder (not shown in FIG. 1) to decode and retrieve their respective digital audio information. In the case of the information from DTS area 10, the system utilizes the decoded information to control the playback of digital audio information contained on another medium.

DTS area 10 contains a digital time code stream, a series of digital data bits, that uniquely identify the location along the film on which the respective time code word is located. The time code synchronizes the playback of audio from a data storage device with the presentation of the pictures from film print 100.

The DOLBY DIGITAL format consists of a series of data blocks 12 placed in between each sprocket hole on one side of the film. There are four data blocks per frame that are read at a rate of 24 frames per second for a total of 96 data blocks per second. Each block contains data bits representing a portion of the digital audio signal. The data bits are recovered through the use of an optical reader and decoded back into analog audio.

SDDS is a digital film sound format comprised of soundtrack area 14, optically printed on both edges of film print 100 (only one edge is shown in FIG. 1). The information contained in SDDS soundtrack area 14 consists of an array of microscopic dots (or pixels) much like those recorded on a CD. With SDDS, both edges of film print 100 are used to provide two continuous streams of data interleaved using a cross-redundant error correction technique to further prevent drop outs from film damage or scratches.

Figure 2:
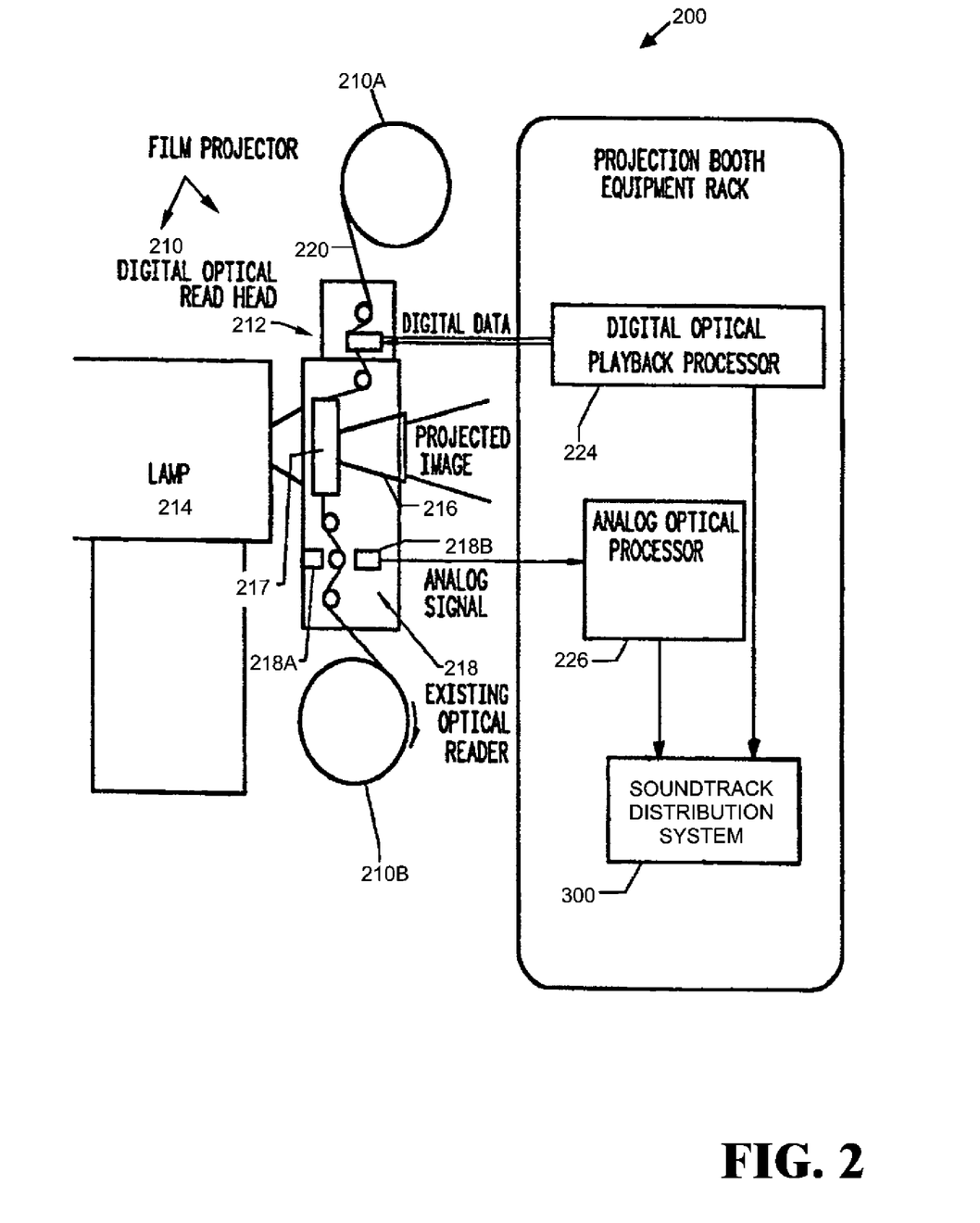
FIG. 2 is a drawing of a system for reading the analog and digital soundtracks and digital time codes from a film print.

FIG. 2 illustrates an exemplary film print playback system 200 for reading the analog and digital soundtracks and digital time codes from a film print 220. Film print projector 210 includes a feed reel 210a and a take-up reel 210b, a digital optical read head 212, a projection lamp 214, a projection lens system 216, an apertured element 217, and an analog optical read head 218.

Normal operation of film playback system 200, starts from feed reel 210a, through several digital optical read heads 212 (currently SRD, SDDS and DTS Time Code), past lamp 214 and apertured element 217, and through analog optical read head 218. As film print 220 proceeds through digital optical read heads 212, a beam of light is transmitted through the digital soundtrack areas of film print 220, which projects the modulated beams onto detectors (not shown). The stream of data from the detectors is supplied to a digital optical playback processor 224. Digital-to-analog converters (not shown) within the digital optical playback processor 224 converts the digitally processed digital soundtrack data into analog form, which is then supplied to a soundtrack distribution system 300. Although only a single digital optical read head and digital optical playback processor is shown and described to handle the reading and decoding of all digital soundtrack information, it should be noted that multiple optical reading and processing elements may be used to achieve the same results. For example, separate readers and decoders may be used for each of the DTS, SDDS and DOLBY DIGITAL soundtracks. In addition, some projection systems may not read or decode all the digital soundtracks. Further, other soundtrack formats not described herein may be used and additional hardware might be needed to read and decode those soundtrack formats. Thus, the actual format or technology that results in audio signals being generated should not be seen as a limitation to scope of the present invention.

As film print 220 continuously advances from digital optical read head 212 past apertured element 217, each picture frame in the film's picture is projected on a display screen (not shown). The projection is accomplished by transmitting light from projection lamp 214 through an aperture in apertured element 217 and through the picture area of film print 220. Projection lens system 216 then projects the resulting picture or visual information onto the display screen. After film print 220 advances from apertured element 217, it moves past analog optical read head 218 to take-up reel 210b. Within read head 218, a light source 218a illuminates the film's analog soundtrack area. The light is modulated as it passes through the analog soundtrack area, and the modulated light signal is received by an analog photo detector 218b. The analog output signal produced by the detector undergoes signal processing within an analog optical processor 226. The processed analog signal from analog optical processor 226 is then, similar to the decoded output signals from digital optical processor 224, supplied to soundtrack distribution system 300. The take-up reel 210b winds the film in the arrangement of FIG. 2.

It should be noted that there will be temporal differences in the reading of the analog and digital soundtracks and projection of picture frame information from film print 220 due to the different physical locations of the soundtrack readers and the apertured element 217 (i.e., a particular portion of film print 220 will pass through each of the different readers and projectors at different times). For example, in the exemplary projector system shown in FIG. 2, digital optical read head 212 is positioned at a distance of a particular number of film frames above apertured element 217. Thus, the sound information stored in the digital soundtracks may be physically located away from the location of the particular picture frame with which they are associated such that the corresponding audio signal is produced at the same time as the picture from the picture frame is being projected. Specifically, the digital bits representing the digital soundtrack for a particular picture frame of film print 220 can be recorded a certain number of film frames behind or ahead the corresponding picture frame. Alternatively, the digital data from digital optical read head 212 can undergo a selected delay period within digital optical processor 224, so that, during playback, the digital data will be decoded and output to soundtrack distribution system 300 at the same time the corresponding analog information is supplied to the same soundtrack distribution system 300.

In another embodiment, video technology may be used to replace any or all of the motion picture and sound playback system. For example, a projection system may use a video tap on the film projection system to display the motion picture on a screen using video projection. Alternatively, a video version of the motion picture may be used as the image source with the sound originating from a film print.

Figure 3:
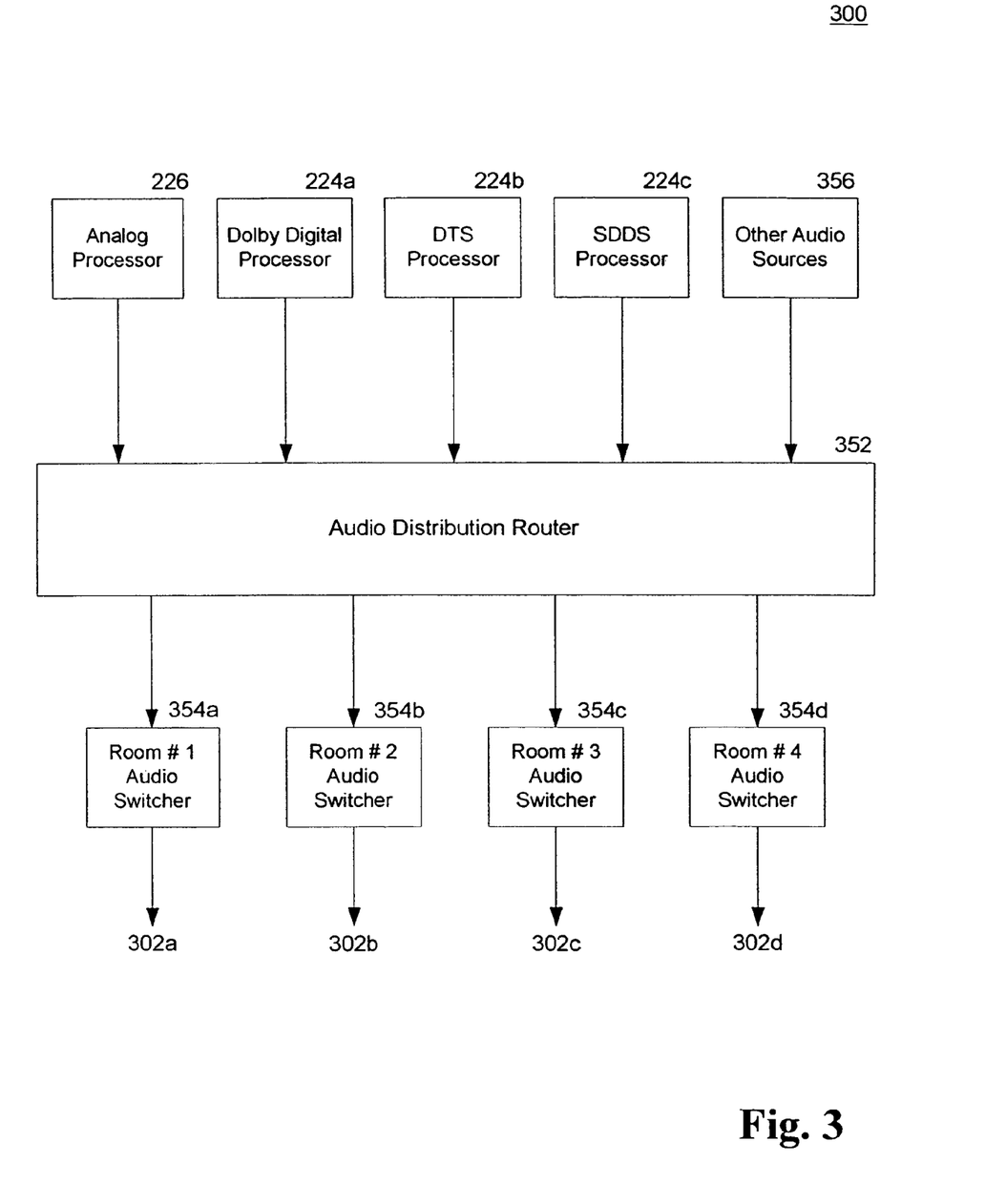
FIG. 3 is a block diagram of a soundtrack distribution system configured in accordance to one embodiment of the present invention.

FIG. 3 is a block diagram of a soundtrack distribution system 300 configured in accordance with one embodiment of the present invention, which includes an audio distribution center 352 coupled to distribute soundtrack signals to a set of viewing room audio switchers 354a–d.

Figure 4:
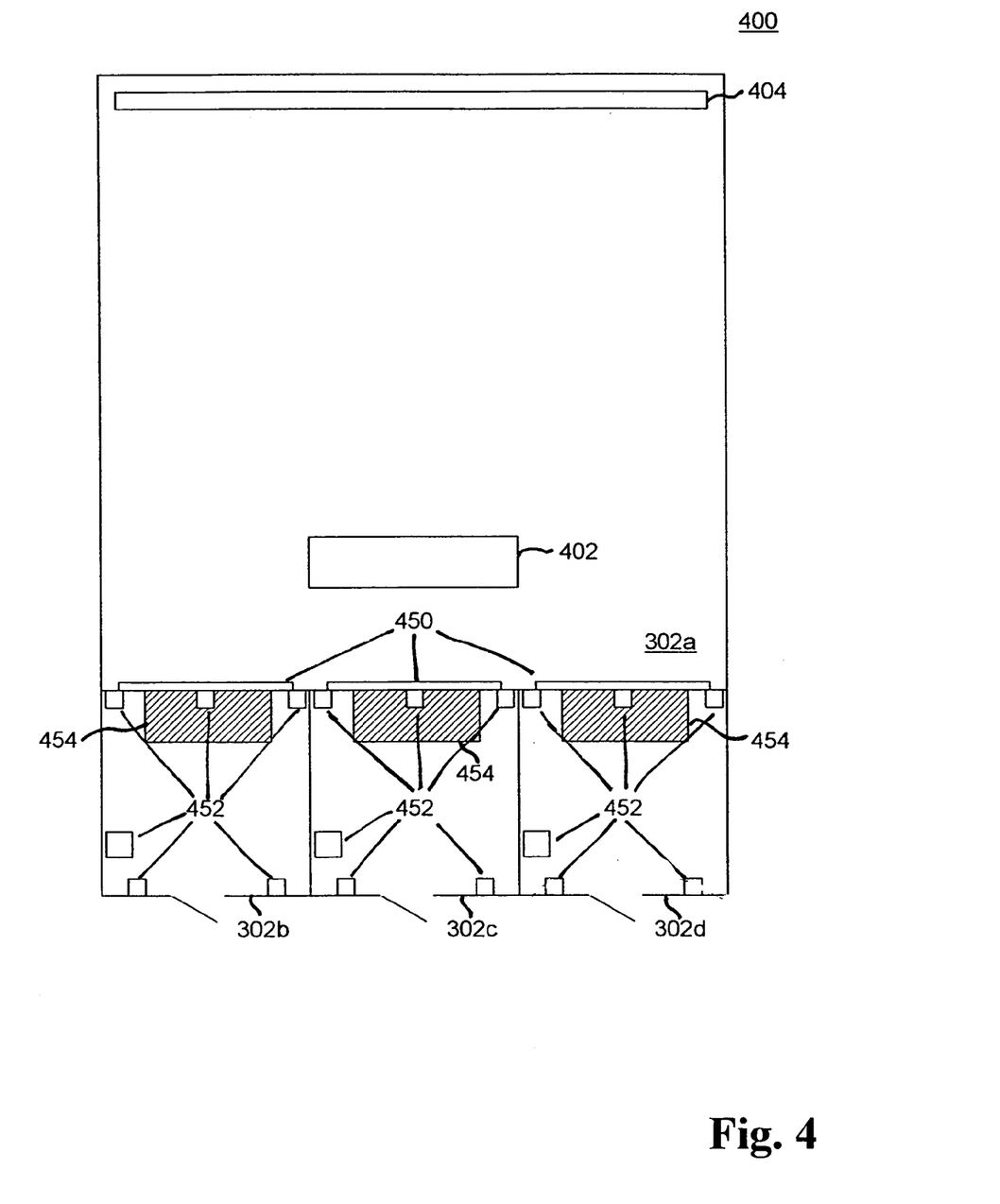
FIG. 4 is a top plan view of a facilities layout for screening multiple film soundtracks, configured in accordance to one embodiment of the present invention.

Soundtrack distribution system 300 receives the decoded analog and digital soundtracks from analog optical processor 226 and digital optical playback processor, respectively, and routes the soundtrack signals to a plurality of screening rooms, e.g., the plurality of screening rooms 302a–d as shown in FIG. 4. Soundtrack distribution system 300 includes other digital soundtrack processors to decode the variety of digital soundtrack formats. All digital soundtrack processors are conceptually shown as digital processors 224a–c. Each screening room may select from one or more soundtracks for playback in the screening room. Thus, each screening room may switch among any one of the soundtracks or select among several soundtracks for playback, depending on the inspection technique of the user.

In one preferred embodiment, soundtrack distribution system 300 operates as follows. Each of the four film playback systems (Analog Stereo, DOLBY DIGITAL, DTS, and SDDS) are processed through their respective analog or digital decoders and delayed appropriately to place all of the soundtracks in synchronization with the picture image. The decoded soundtracks (all in 5.1 or 7.1 channel analog format) are sent to audio distribution router 352. Any additional 5.1 or 7.1 channel audio sources, including the audio masters from which the film negatives and prints were created, are also sent to audio distribution router 352. All of the 5.1 or 7.1 channel sources are then distributed via the audio router to the four independent audio switchers 354a–d for the four individual screening rooms 302a–d. In one preferred embodiment, audio distribution router 352 is configured to receive a plurality of individual audio signals and route them to any or up to all of its available outputs.

Each screening room has a remote control for that screening room's respective audio switcher. Using the switcher, the viewer is then able to independently select among any of the multi-channel audio sources individually or sum all of the sources together. By individually selecting each audio source, the reviewer can compare the relative quality of the different film formats against each other or against the source master or other provided sound elements. By summing the audio formats together the viewer is able to check for synchronization relationships between the individual sources. Any audible delay or echo between the different film formats or playback sources would reflect a synchronization issue.

The desired output from each viewing room's audio switcher is fed to amplifiers and then speakers, or to powered speakers directly. The corresponding 5.1 or 7.1 channels of audio are fed to their respective speakers in the listening environment. It should be noted that 5.1 and 7.1 channel audio configurations are common, but do not represent all of the audio format possibilities and should not be seen as a limitation to scope of the present invention. In addition, the signals being processed and routed, instead of being in the form of individual analog channels, may be in other formats. Thus, for example, the soundtrack information may be transferred in an undecoded form and decoded locally at the viewing room's audio switcher.

In addition to the various embodiments of the soundtrack distribution system described above that offer dynamic routing of the soundtracks, it should be noted that each screening room may be "hardwired" to receive one or more predetermined sound sources. Thus, for example, a screening room may be designated a SDDS screening room.

Thus, through the use of soundtrack distribution system 300, a reviewer is able to select one or more soundtracks for simultaneous playback in the reviewer's screening room and employ standard soundtrack reviewing techniques. For example, as discussed above, when multiple soundtracks are played back simultaneously, any minute discrepancies in the synchronization between the tracks may be more easily detected through the detection of any delay or echo in the playback.

FIG. 4 is a top plan view of a facilities layout 400 for simultaneously screening multiple soundtracks, configured in accordance to one embodiment of the present invention. Facilities layout 400 includes a display screen 404 and plurality of screening rooms 302a–d. Although screening rooms 302b–d are shown as being rectangular in shape, the actual shape, size, placement and orientation of the screening rooms is not critical. What is important is that each screening room has an unobstructed view of display screen 404. Further, each screening room is preferably acoustically isolated from the other screening rooms, such that the audio output in the other screening rooms will not affect the user. A projection room (shown in FIG. 5) is located above the smaller screening rooms 302b–302d.

In one embodiment, a set of smaller screening rooms 302b–d is built behind a main screening room console 402 as an extension of main screening room 302a. In another embodiment, smaller screening rooms 302b–d are constructed inside main screening room 302a. In the first embodiment, the rear wall of main screening room 302a is modified to create openings so that each screening room, rooms 302b–d, is provided with a window 450 so that a user may view display screen 404. In the second embodiment, the screening rooms are built into and thus use some of the space of the main screening room 302a. In addition, each screening room is provided with a set of speakers 452 for playback of the selected audio soundtrack(s) and a console 454 for selecting and controlling the playback of the soundtracks. Allowing the selection and control of the playback of the soundtrack(s), each console (main screening room console 402 or console 454) may permit a user to remotely control the motion of the picture and the sound equipment. Further, the console may contain logging functionality to allow a user to compile notes and review information during the playback of the motion picture film.

The console serves several different functions. First, all of the Quality Control programs for each of the digital film formats (DTS, SDDS, and DOLBY DIGITAL) are displayed for the viewer to inspect. Any defects in the digital data stream present on the film print or associated sound negative are reflected in the Quality Control programs. These programs are PC based and are supplied by the respective manufacturers, (DOLBY, a trademark of Dolby Laboratories Licensing Corporation, DTS, and SONY, a trademark of Sony Corporation). A separate computer is also provided for note-taking, email, and Internet access.

The console also provides optional motion control over any number of film projectors used in the system. In one embodiment, only the primary/main screening room has the option to control the motion of the projectors as the projector can only perform one function at a time—i.e. Fast Forward, Play, Reverse, Pause, etc. In another embodiment, each viewing room has the option of controlling the motion of the projector, but only one room/console at a time could actually control the projector at any given time. In the preferred embodiment of the present invention, a projectionist is typically responsible for controlling the motion of the projectors while the viewers are responsible for selecting and evaluating the audio formats.

As stated previously, the console contains the remote control for the respective viewing room's audio switcher. The viewer uses the remote to select the desired audio format or formats to hear through the viewing rooms multichannel speaker system. In one embodiment, the console also contains a communications system to provide two-way communication between the respective viewing room and any other viewing room or projection booth.

It should be noted that the construction of the screening rooms in implementing the various embodiments of the present invention may occur in situations where an existing screening facility having one screening room is converted, or "remodeled," into multiple screening rooms. Thus, as opposed to constructing a new screening facility with a group of screening rooms and a projection room, an existing screening facility may be remodeled so that a remodeled screening facility having multiple screening rooms is created. In one embodiment, the original screening room is remodeled to include the additional screening rooms. In another embodiment, the additional screening rooms are attached to the original screening room, where, as described above, a set of openings are created in one wall of the original screening room to allow each attached screening room to view the display screen in the original screening room.

During a typical motion picture film screening and playback session, a different reviewer or user sits in each one of screening rooms 302a–d. The film is played, and each user is assigned to review a particular soundtrack, although a user may listen to a different soundtrack or more than one soundtrack simultaneously, as discussed herein. In one method of review, each user logs any quality or discrepancy issues with respect to the soundtrack the user is reviewing, as these issues are detected, without stopping the playback of the motion picture film. In another method, each user may control the playback of the motion picture (e.g., stop, rewind or fast forward the playback of the motion picture). In yet another method, only one user may control the playback, and all other users must make their requests to control the playback to this user. For example, one user may be responsible for controlling the soundtrack to which each user listens by controlling the signals generated by the user. The ability for multiple users to review the separate soundtracks for the motion picture film print simultaneously will allow the motion picture film print to be completely reviewed in one playback session. That is, the motion picture film print will only have to be played back once from beginning to end.

Figure 5:
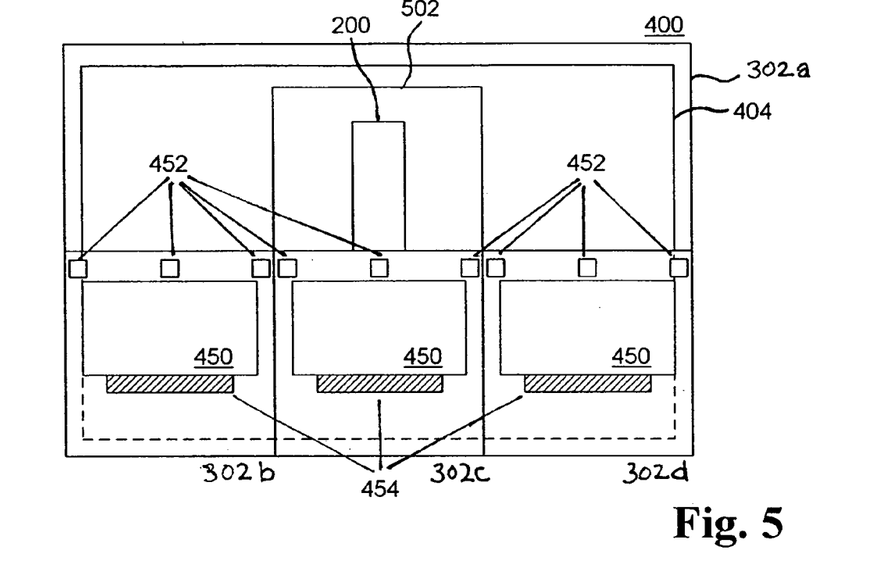
FIG. 5 is an elevation view of the first facilities layout, viewed facing the display, for screening multiple film soundtracks of FIG. 4.

FIG. 5 is a rear elevation view of first facilities layout 400, where a projection room 502 is shown located above set of smaller screening rooms 302b–302d. Projection room 502 contains the motion picture film projection system, soundtrack readers and decoders, and soundtrack distribution system.

Figure 6:
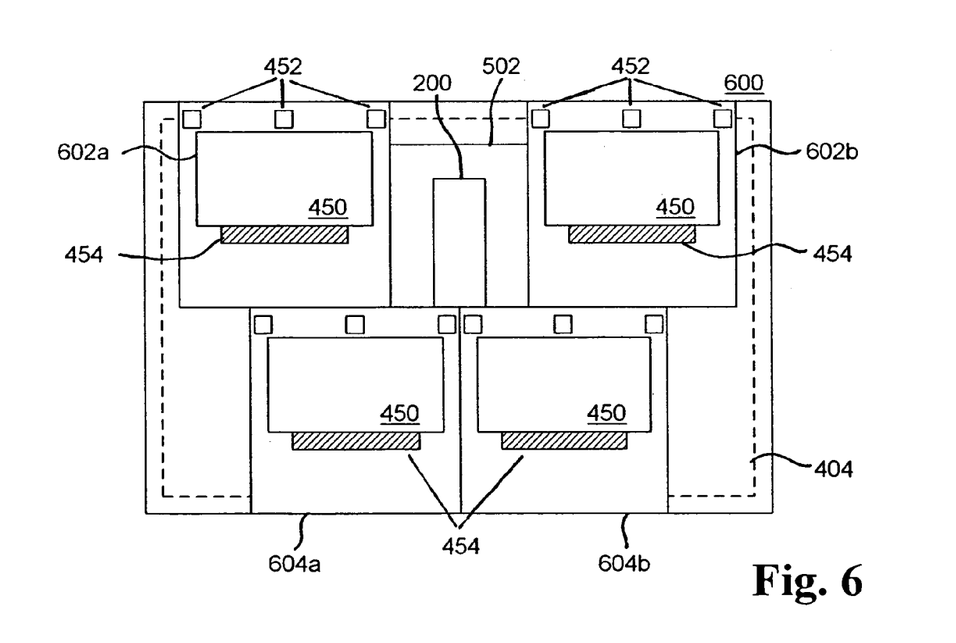
FIG. 6 is an elevation view of a second facilities layout, viewed facing the display, for screening multiple film soundtracks, configured in accordance to another embodiment of the present invention.

FIG. 6 is a rear elevation view of a second facilities layout 600 for screening multiple soundtracks configured in accordance to another embodiment of the present invention. In second facilities layout 600, two upper screening rooms 602a–b are located directly above two lower screening rooms 604a–b. A projection room 606 is located between the two upper screening rooms 602a–b. With the inclusion of the main screening room, the embodiment shown in second facilities layout 600 allows the simultaneous screening of 5 different soundtracks.

Figure 7:
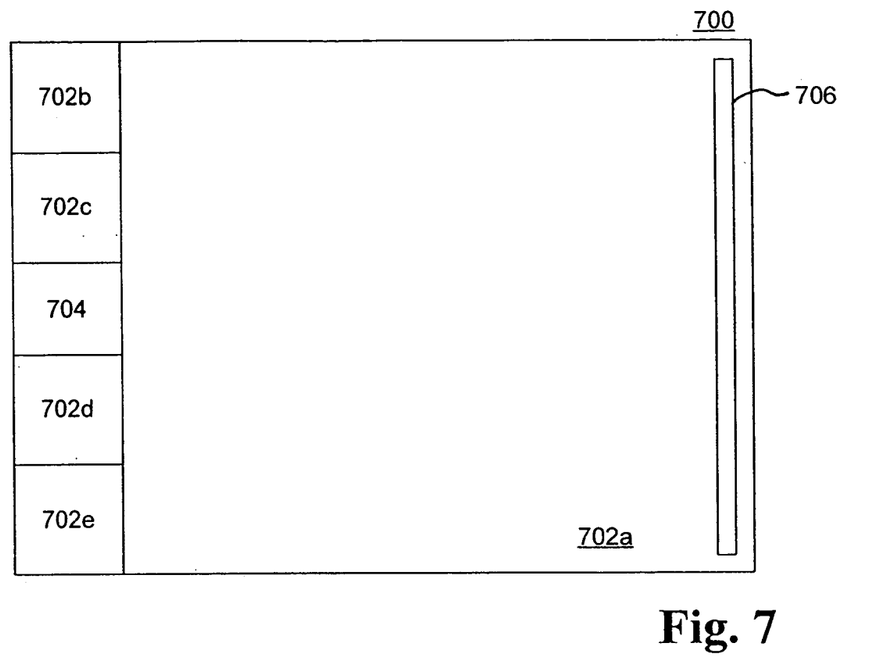
FIG. 7 is a top plan view of third facilities layout for screening multiple film soundtracks, configured in accordance to another embodiment of the present invention.

FIG. 7 is a top plan view of a third facilities layout 700 for screening multiple soundtracks configured in accordance to another embodiment of the present invention. Third facilities layout 700 includes a group of screening rooms 702b–e arranged in line with a projection room 704 that projects the motion picture on a display screen 706. As discussed above, in one embodiment, the group of screening rooms 702b–e and projection room 704 are created as a part of a main screening room 702a. In another embodiment, the group of screening rooms 702b–e are created as an addition to main screening room 702a.

Figure 8:
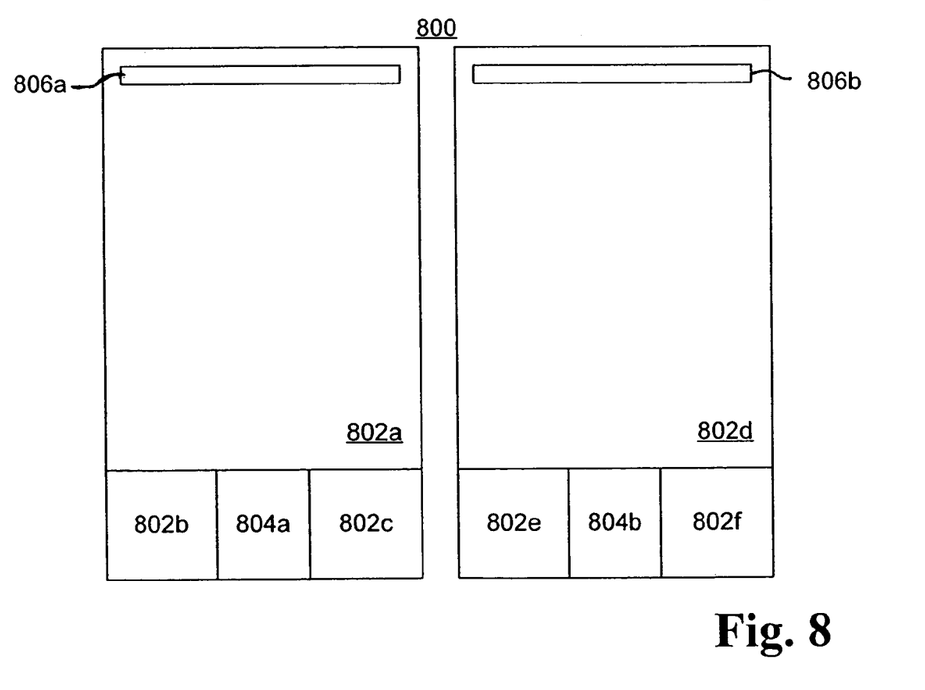
FIG. 8 is a top plan view of fourth facilities layout for screening multiple film soundtracks, configured in accordance to another embodiment of the present invention.

FIG. 8 is a top plan view of a fourth facilities layout 800 for screening multiple soundtracks configured in accordance to another embodiment of the present invention. Fourth facilities layout 800 includes two separate screening rooms 802a and 802d, with two groups of screening rooms 802b–c and 802e–f arranged in line with two projection room 804a and 804b, respectively. Screening rooms 802a and 802d each contain a display screen 806a and 806b, respectively. The two groups of screening rooms 802b–c and 802e–f and projection rooms 804a and 804b are created as a part of a main screening room 802a and 802d, respectively. In this configuration, two smaller main screening rooms may be used if space is an issue to achieve the same results as a larger main screening room that can accommodate more screening rooms. In fourth facilities layout 800, the motion picture display should be synchronized such that the display in the two main screening rooms 802a and 802d are synchronized. This may be achieved, for example, through the use of a motion picture film projection system in main screening room 802a and a video feed of the motion picture film projection to be displayed on a video display system in main screening room 802b.

Although the different components for reading, decoding, and playing back the soundtrack and picture information for a particular film print has been described as separate components, it should be noted that the described system is only an exemplary system, and may be reconfigured in a variety of ways that still fall under the present inventive concepts contained herein. For example, one or both the soundtrack decoders may be physically integrated with the soundtrack distribution system. In another example, the screening rooms may be arranged in a different configuration from what has been described above, such as in a semi-circular arrangement. Further, the embodiments described above are exemplary embodiments of a soundtrack reviewing system configured in accordance with one embodiment of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A method comprising:
    displaying a movie print on a display screen, the movie print comprising multiple soundtracks;
    making available different audio signals from at least two soundtracks of the multiple soundtracks to a plurality of screening rooms, each screening room with a view of the display screen; and,
    reviewing, in each of the plurality of screening rooms, a respective one of the different audio signals to determine a presence of any quality issues in the at least two soundtracks from which the different audio signals are respectively provided.

2. The method of claim 1, wherein each of the plurality of screening rooms receives only one audio signal representative of one soundtrack of the at least two soundtracks from the different audio signals.

3. The method of claim 1, wherein at least one of the plurality of screening rooms receives multiple ones of the different audio signals.

4. The method of claim 3, further comprising playing back the multiple ones of the different audio signals simultaneously.

5. The method of claim 1, wherein each screening room in the plurality of screening rooms is effectively acoustically isolated from the other screening rooms.

6. The method of claim 1, further comprising controlling the displaying of the movie print from one of the plurality of screening rooms.

7. The method of claim 1, further comprising controlling the making available of the different audio signals from at least one of the plurality of screening rooms.

8. A method for reviewing a multi-soundtrack movie print having a plurality of soundtracks comprising:
    displaying the multi-soundtrack movie print, the multi-soundtrack movie print viewable in a plurality of screening rooms; and,
    playing, for review, audio from the plurality of soundtracks of the multi-soundtrack movie print to the plurality of screening rooms, wherein at least two of the plurality of screening rooms each receives audio from a different soundtrack.

9. A system for reviewing a movie print having a plurality of soundtracks comprising:
    a soundtrack playback system configured to produce audio signals from the plurality of soundtracks in a plurality of screening rooms during a display of the movie print, wherein at least two of the screening rooms of the plurality of screening room receives a different soundtrack from each other; and,
    a control system configured to switch between the audio signals produced from the plurality of soundtracks in at least one of the screening rooms to review the audio signals.

10. The system of claim 9, wherein each screening room is effectively isolated acoustically.

11. The system of claim 9, wherein each screening room is configured to allow receipt of a set of soundtracks from the plurality of soundtracks.

12. The system of claim 11, wherein the control system is configured to allow control of playback of at least one soundtrack of the plurality of soundtracks from at least one screening room.

13. The system of claim 12, wherein the playback of the at least one soundtrack is contemporaneous with the playback of a master soundtrack.

14. The system of claim 9, wherein at least one screening room is configured to allow control of the playback of the movie print.

15. The system of claim 9, wherein at least one screening room is configured to allow control of the soundtrack playback system.

16. A method for converting an existing film screening facility to review a multi-soundtrack film print, the film screening facility including a first screening room and a display screen, comprising:
    adding a plurality of screening rooms to the screening room, each with a view of the display screen;
    adding a multi-soundtrack playback system capable of producing audio from a plurality of soundtracks of the multi-soundtrack movie print; and,
    providing controls for reviewing a quality of at least one soundtrack of the plurality of soundtracks of the multi-soundtrack film print.

17. The method of claim 16, wherein the multi-soundtrack playback system is capable of transferring the produced audio to the screening rooms.

18. The method of claim 16, further comprising acoustically isolating each screening room.

19. A system comprising:
    a display;
    a plurality of screening rooms, wherein each screening room includes a view of the display;
    a movie playback system;
    a sound distribution system coupled to receive audio signals from the movie playback system and to distribute the audio signals to the plurality of screening rooms; and,
    a soundtrack review system comprising controls to control the playback of the audio signals to allow review of the audio signals from the movie playback system.

20. The system of claim 19, wherein each screening room in the plurality of screening rooms is effectively acoustically isolated.

21. A soundtrack distribution system comprising:
    at least two soundtrack processors, each providing an audio signal;
    an audio distribution router coupled to receive the audio signals generated by the at least two soundtrack processors;
    a plurality of audio switching devices coupled to the audio distribution router; and,
    a control system coupled to the audio distribution router and configured to allow control of the switching between the audio signals generated by the at least two soundtrack processors.

22. The soundtrack distribution system of claim 21, where the audio distribution router comprises:
    a plurality of inputs coupled to the plurality of soundtrack processors; and,
    a plurality of outputs coupled to the plurality of audio switching device;
    wherein the audio distribution router is configured to selectively route the plurality of inputs to the plurality of outputs.

23. The soundtrack distribution system of 22, where each input in the audio distribution router is coupled to a corresponding audio switching device.

24. The soundtrack distribution system of 22, where each output in the audio distribution router is coupled to a corresponding soundtrack processor.

25. The soundtrack distribution system of 22, where the audio distribution router is configured to route a selected number of the plurality of inputs to the plurality of outputs.

26. The soundtrack distribution system of 22, where the audio distribution router is configured to route the plurality of inputs to a selected number of the plurality of outputs.

27. The soundtrack distribution system of 21, where each audio switching device is configured to allow the selection of one or more audio signals for playback.

28. The soundtrack distribution system of 22, where the audio signal comprises multiple channels of audio signals.

29. The soundtrack distribution system of 28, where playback of the selected audio signals is simultaneous.

30. The soundtrack distribution system of 21, wherein the control system is further configured to allow control of a playback of a movie print.

* * * * *